UNITED STATES PATENT OFFICE.

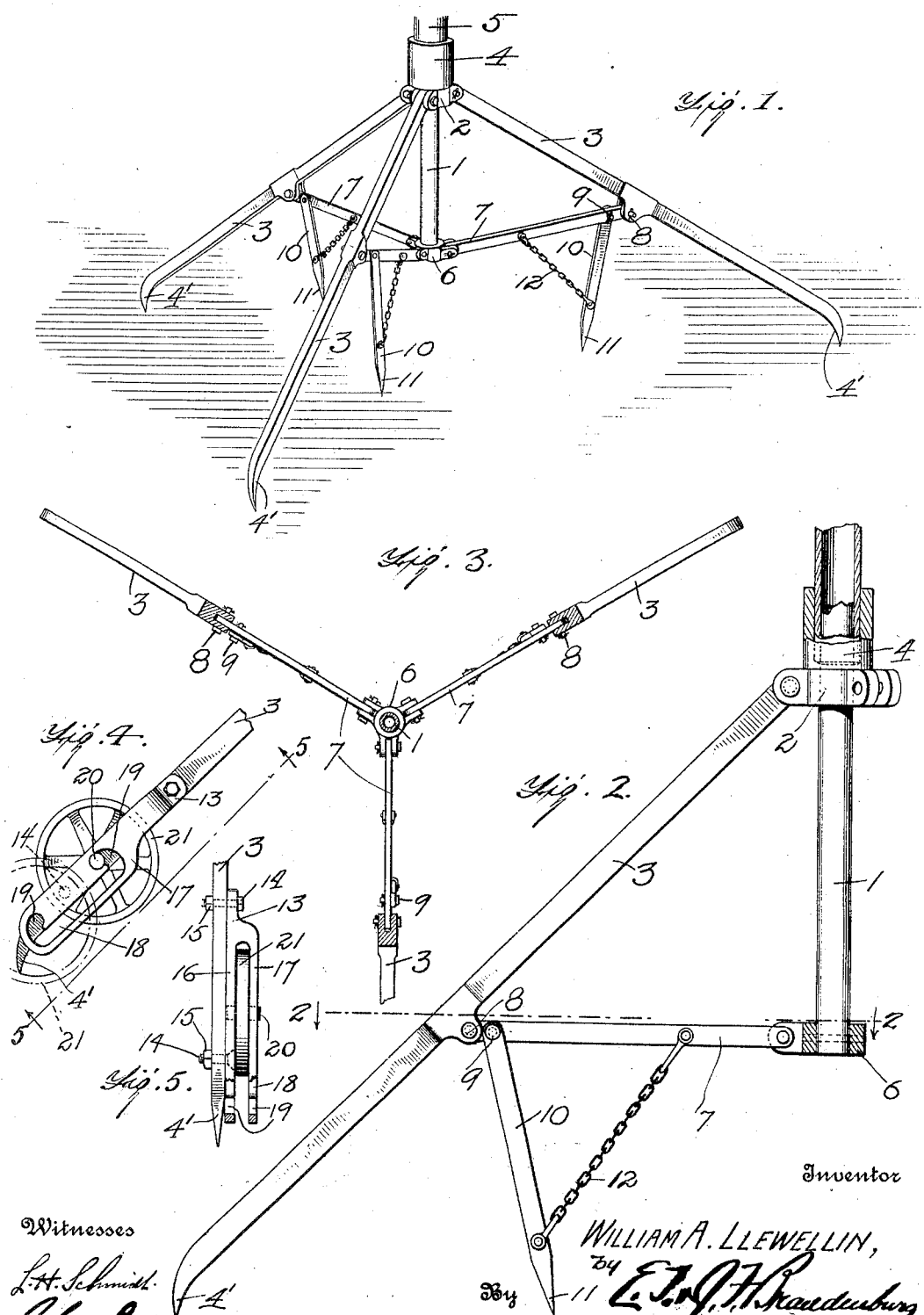

WILLIAM ALFRED LLEWELLIN, OF BRISTOL, ENGLAND, ASSIGNOR OF ONE-HALF TO FRANCIS W. SMITH, OF SOUTHAMPTON, ENGLAND.

SUPPORT.

1,099,505. Specification of Letters Patent. Patented June 9, 1914.

Application filed January 8, 1914. Serial No. 811,065.

*To all whom it may concern:*

Be it known that I, WILLIAM ALFRED LLEWELLIN, a subject of the King of England, residing at Baden House, Waterloo Road, Bristol, England, have invented new and useful Improvements in Supports, of which the following is a specification.

The object of my invention is to provide a support, in the nature of a tripod, which, by reason of its peculiar construction, is braced in a very efficient manner, against collapse, when in use.

The invention is characterized by simplicity in construction, and yet embodies a maximum of strength and utility.

With the above-mentioned object in view, and others appearing as the specification proceeds and the nature of the invention more fully appears, the invention resides in the novel construction, combination and arrangement of parts, as will be hereinafter fully pointed out in the specification, summed up in the claims, and illustrated in the drawing.

In the accompanying drawing, I have graphically exhibited an illustrative example or form of embodiment of my invention capable of carrying out the underlying principles thereof; and in this drawing—

Figure 1 is a perspective view of the tripod extended, in use; Fig. 2 is a fragmentary detail view, partly in section, of my tripod; Fig. 3 is a horizontal section on the line 2—2, Fig. 1; Figs. 4 and 5 are fragmentary detail views of a tripod-leg carrying a wheel attachment.

Referring, now, in detail to the drawing: 1 designates a rod or bar carrying, toward one end thereof, a ring 2, to which are hinged tripod-legs 3 (in a manner similar to that in which umbrella-ribs are secured to the umbrella-stick). The particular manner of hinging the legs 3 forms no part of my invention, the manner suggested being a common expedient, and given as an illustration, merely. The tripod legs 3 are preferably provided, at their free extremities, with curved, pointed terminals 4', whereby the legs bite into the ground, or other surface, upon which the tripod may be placed, when in operative position. Carried by said ring-end of the rod 1 is a socket 4, formed as a relatively short tube, in which may be removably disposed the rod 5 of the article to be supported by the tripod. For instance, the rod 5 may be a flag-staff, or anything else. The rod 1 carries, toward its lower end, a ring 6, to which are hinged bars 7, the other ends of which are hinged, as at 8, to the legs 3, intermediate their length.

Depending from each bar 7 preferably toward the end thereof which is connected with the leg 3, and pivoted to said bar, as at 9, is an arm, 10, having a pointed free extremity 11. Preferably, the arm 10 is correlated with the bar 7 by a second connection, which may be a chain 12, limiting movement of the arm 10 in one direction. In tripods of ordinary construction, the legs 3 are liable to collapse or break under certain stress; but, with my construction, the legs are strongly braced by the coöperating members 7 and 10.

As will be understood, by reason of the pivotal or hinge connection of the different parts, as before described, the tripod may be folded, when not in use, so as to occupy a small compass, the ring 6 reciprocating, for this purpose, on the rod 1.

While I have described, with great particularity, the preferred embodiment of my invention, yet it is to be understood that all changes in construction comprehended by the appended claims constitute no departure from the spirit of the invention.

Referring, now, to Figs. 4 and 5, showing a wheel-attachment, which may be carried by each tripod-leg 3, for the purpose of facilitating movement of the tripod along the ground. This wheel attachment may be either integral with the tripod-leg, or, as shown in the drawing, may be separate therefrom and suitably secured thereto. In this instance, said attachment comprises a bracket 13 suitably secured to the tripod leg 3 in any desired manner, as by bolts and nuts, 14 and 15, respectively. The bracket 13 is formed with two parallel, spaced legs 16, 17, the former of which lies against the tripod-leg 3. The legs 16, 17 are provided with longitudinally-extending, parallel slots 18, each of said slots being provided, at each end thereof, with a curved extension 19 arranged at an angle to said slot, and forming a seat for the axle 20 of a wheel 21. As shown in the drawing, the axle 20 is disposed in the upper seat or extension 19; but, by manually moving the axle out of said upper extension or seat and sliding it down the slot 18, it may be guided into the lower seat 19, whereby the wheel is adjustably disposed with reference to the bracket 13 and the leg 3.

Having thus fully described my invention, what I claim as new and desire to secure by Letters-Patent of the United States is:

1. In a supporting-mechanism, a rod, a plurality of legs hinged thereto, means connecting said legs, intermediate of their length, with said rod, and depending bracing-members carried by said means.

2. In a supporting-mechanism, a rod, a plurality of legs carried thereby, means connecting said legs, intermediate of their length, with said rod, and depending bracing-members carried by said means.

3. In a supporting-mechanism, a rod, a plurality of legs carried thereby, means connecting said legs, intermediate of their length, with said rod, and depending bracing-members pivotally carried by said means.

4. In a supporting-mechanism, a rod, a plurality of legs carried thereby, bars connecting said legs, intermediate of their length, with said rod, and depending bracing-members carried by said bars.

5. In a supporting-mechanism, a rod, a plurality of legs carried thereby, bars connecting said legs, intermediate of their length, with said rod, and depending, pointed bracing-members carried by said bars.

6. In a supporting-mechanism, a rod, a plurality of legs carried thereby, bars connecting said legs, intermediate of their length, with said rod, depending bracing-members carried by said bars, and flexible connections between said members and said bars.

7. In a supporting-mechanism, a rod, a plurality of legs carried thereby, bars connecting said legs, intermediate of their length, with said rod, depending bracing-arms carried by said bars, and flexible connections between said arms and bars.

8. The combination, in a tripod having the customary tripod-legs, of mechanism operatively associated with said tripod for bracing said legs against breaking, including pivoted, ground-engaging members.

In testimony whereof, I have hereunto set my hand in presence of two subscribing witnesses.

WILLIAM ALFRED LLEWELLIN.

Witnesses:
F. R. NEWTON,
E. D. JONES.

Copies of this patent may be obtained for five cents each, by addressing the "Commissioner of Patents, Washington, D. C."